(12) United States Patent
Ishikawa et al.

(10) Patent No.: US 7,866,898 B2
(45) Date of Patent: Jan. 11, 2011

(54) OPTICAL COMMUNICATION MODULE

(75) Inventors: Yoshihiro Ishikawa, Atsugi (JP);
Shinichi Asano, Hitachinaka (JP);
Youichi Itagaki, Atsugi (JP)

(73) Assignee: Mitsumi Electric Co., Ltd., Tama-shi (JP)

( * ) Notice: Subject to any disclaimer, the term of this patent is extended or adjusted under 35 U.S.C. 154(b) by 0 days.

(21) Appl. No.: 12/400,924

(22) Filed: Mar. 10, 2009

(65) Prior Publication Data

US 2009/0257720 A1  Oct. 15, 2009

(30) Foreign Application Priority Data

Apr. 9, 2008  (JP) .............................. 2008-100918

(51) Int. Cl.
*G02B 6/36* (2006.01)
(52) U.S. Cl. .............................. 385/92; 385/53; 385/88
(58) Field of Classification Search .................... 385/53, 385/88, 92
See application file for complete search history.

(56) References Cited

U.S. PATENT DOCUMENTS

| | | | |
|---|---|---|---|
| 5,975,916 | A | 11/1999 | Okura |
| 7,114,859 | B1 | 10/2006 | Tuohimaa et al. |
| 7,331,812 | B2 * | 2/2008 | Nishio et al. ................. 439/342 |
| 2007/0122090 | A1 | 5/2007 | Nishio et al. |

FOREIGN PATENT DOCUMENTS

| | | |
|---|---|---|
| DE | 197 51 970 A1 | 9/1998 |
| EP | 2 048 750 A1 | 4/2009 |
| JP | 2007-157363 A | 6/2007 |

OTHER PUBLICATIONS

Extended European Search Report and Written Opinion dated Jul. 20, 2009 (in English) issued in counterpart European Application No. 09003484.4-1524.

* cited by examiner

*Primary Examiner*—Jennifer Doan
(74) *Attorney, Agent, or Firm*—Holtz, Holtz, Goodman & Chick, PC

(57) ABSTRACT

Disclosed is an optical communication module including a module base in an approximately rectangular shape in which the light path member is introduce from one end surface in a longitudinal direction, a cover member provided at an upper portion of the module base and a plurality of pairs of conductive members in which each of the conductive members constituting a pair are respectively disposed at both outside surfaces of the module base and which are electrically connected to the light path member, and a concave portion is formed at an upper surface of the module base, the cover member is formed so as to cover an opening of the concave portion, and the conductive members are formed so as to extend for equal lengths toward an upper surface side and a lower surface side of the module base from a center line of a height direction of the outside surfaces.

7 Claims, 10 Drawing Sheets

OPTICAL COMMUNICATION MODULE

BACKGROUND OF THE INVENTION

1. Field of the Invention

The present invention relates to an optical communication module.

2. Description of Related Art

Conventionally, there is known an optical communication module which is provided at an end portion of a light path member such as an optical fiber and an optical waveguide and which electrically connects the light path member and the connector by being connected to a connector on the electronic substrate (for example, see JP2007-157363).

In such optical communication module, a plurality of electrodes 210 are provided at the lower surface side of the outside surface 200a as shown in FIG. 10 and a plurality of contacts provided at the inner surface of the connector and the electrodes 210 are to contact each other to be electrically connected when the optical communication module 200 is engaged in the hollow portion of the connector (omitted from the drawing) from above.

However, the electrodes 210 are disproportionately provided at the lower side of the outside surface 200a in the optical communication module 200 described in JP2007-157363. Therefore, also in connection with the placement of the contacts, the optical communication module 200 always had to enter the connector in a state where the lower surface thereof facing downward, that is, the optical communication module 200 had to enter the connector in a certain direction. Also in connection with pulling of the light path member 300 which is to be connected to the optical communication module 200, this greatly limits the flexibility of design of the electronic substrate to which the connector is to be mounted also.

For example, when the optical communication module and the connector can only be engaged in a certain direction as described above, it is difficult to meet the request to make the electronic parts thinner in the recent mobile devices. In recent mobile devices, there are many devices that have sliding mechanism where two electronic substrates which are electrically connected move in parallel to each other. In order to make the mobile devices thinner while being provided with the sliding mechanism, it is preferable that two electronic substrates 240, 240 and two connectors 220, 220 are structured so as to have a positional relation where the electronic substrates and the connectors are arranged alternately as shown in FIG. 9B and not in a structure where the two electronic substrates 240, 240 sandwich the connectors 220, 220 as shown in FIG. 9A. However, when the conventional optical communication module 200 which only can connect with the connector 220 in a certain direction is used, the 45 degrees-mirrors 310, 310 (see FIG. 10) at both ends of the optical waveguide film 300 which is to be connected to the optical communication module 200 need to be formed so as to oppose to each other in order to have the two electronic substrates 240, 240 be structured in the above positional relation without twisting the light waveguide film 300 as the light path member. Further, when the optical waveguide film 300 is processed so that the 45 degrees-mirrors 310, 310 at both ends of the optical waveguide film 300 oppose each other, there is a possibility that the operation becomes complicated, the cost may increase and the yield may be reduced.

SUMMARY OF THE INVENTION

In view of the above problem, an object of the present invention is to provide an optical communication module which can improve flexibility of design of the electronic substrate to which the connector is to be mounted comparing to the conventional optical communication module.

According to a first aspect of the present invention, there is provided an optical communication module which is provided at an end portion of a light path member and which electrically connects the light path member and a connector via an optical signal processing unit by being engaged in the connector comprising a module base in an approximately rectangular shape in which the light path member is introduce from one end surface in a longitudinal direction, a cover member provided at an upper portion of the module base and a plurality of pairs of conductive members in which each of the conductive members constituting a pair are respectively disposed at both outside surfaces of the module base extending in the longitudinal direction and which are electrically connected to the light path member, and a concave portion is formed at an upper surface of the module base, the cover member is formed so as to cover an opening of the concave portion, and the conductive members are formed so as to extend for equal lengths toward an upper surface side and a lower surface side of the module base from a center line of a height direction of the outside surfaces.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings.

Figure 1:
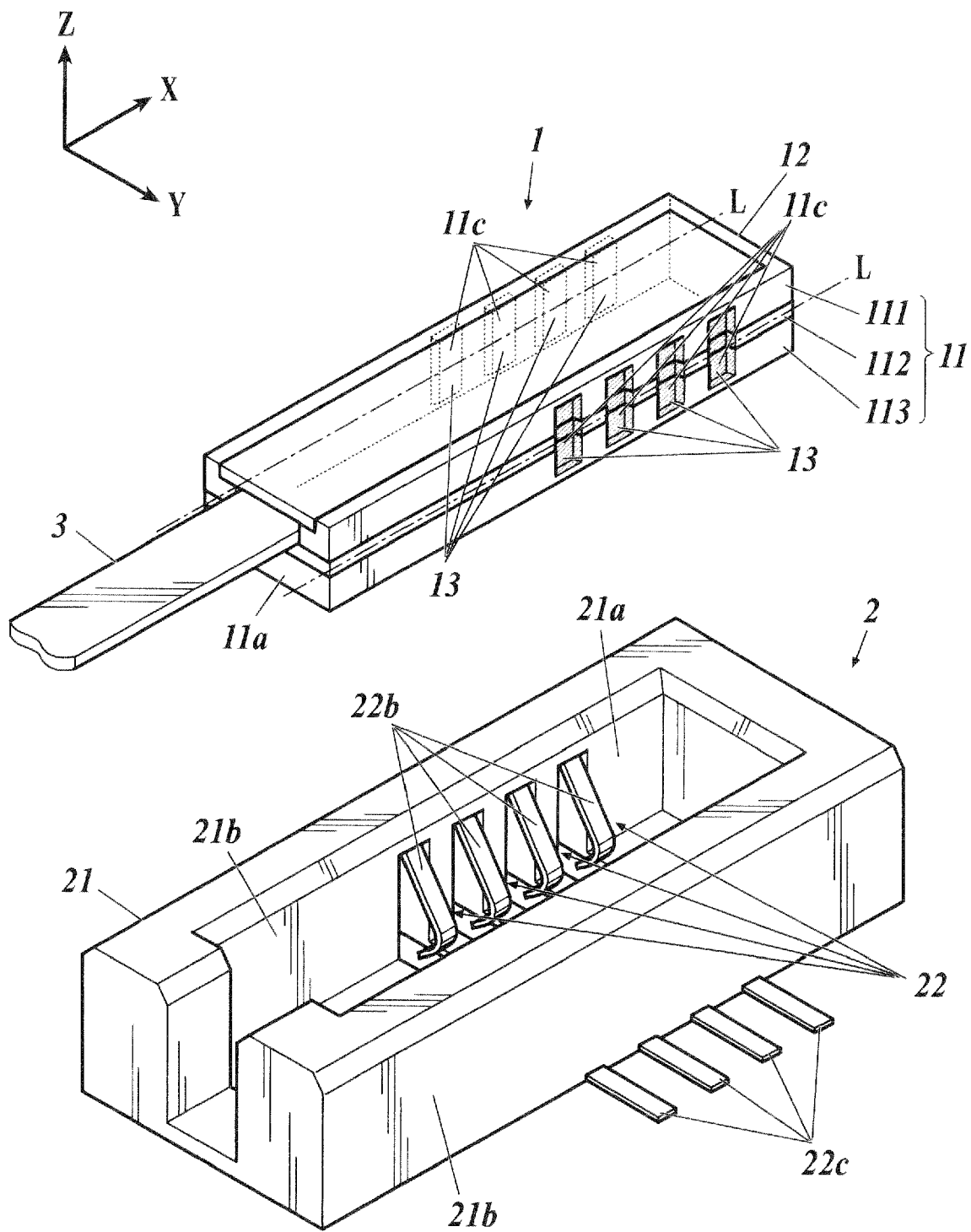
FIG. 1 is a schematic view of a module, a connector and a light path member.

First, the connector 2 and the light path member 3 which are to be connected with the optical communication module (hereinafter, called module) 1 according to the present invention will be described with reference to FIGS. 1 and 2. Here, FIG. 1 is a schematic view of the module 1, the connector 2 and the light path member 3, and FIG. 2 is a cross-sectional view orthogonal to the longitudinal direction of the connector 2.

The connector 2 comprises a connector base 21 and contacts 22, and the connector 2 is fixed to the electronic substrate which is not shown in the drawing. The connector base 21 is formed in an approximately rectangular shape having a hollow portion 21a in which the module 1 engages from the upper surface side. The hollow portion 21a is formed in an approximate rectangular shape, and four pairs of contacts 22, each of two contacts 22 constituting a pair being respectively positioned at both inner surfaces of the hollow portion 21a so as to be at the same position in the longitudinal direction X, are disposed at both inner side surfaces of the hollow portion 21a by being equally spaced along the longitudinal direction X.

Figure 2:
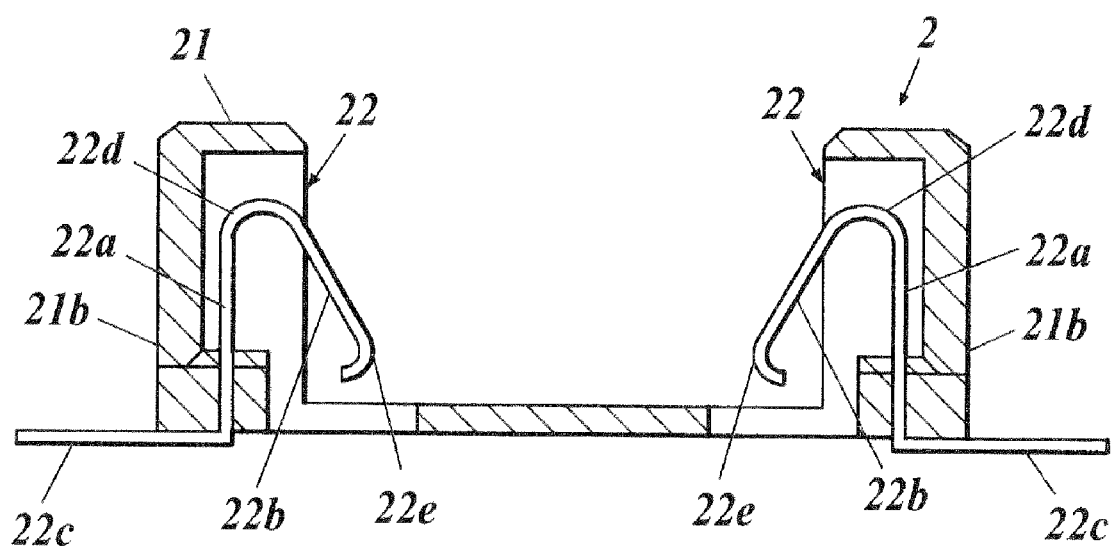
FIG. 2 is a cross-sectional view orthogonal to a longitudinal direction of the connector.

As shown in FIG. 2, the contacts 22 are formed by bending each of the end portions of a lengthy plate like elastic member having conductivity in opposite directions with respect to the surface of the plate like elastic member. The center portions are indicated as fixation units 22a and the end portions are indicated as contacting units 22b and lead units 22c, respectively.

The fixation units 22a are formed so as to stand approximately perpendicular from one end of the lead units 22c which are disposed parallel to the bottom surface of the connector 2, and the fixation units 22a are fixed to the connector base 21 at circumference of the stand-up portion. Each of the fixation units 22a is bent at the upper end portion, and a portion which extends from the bent portion 22d in an opposite direction of the extending direction of the lead portion 22c and which incline downward is the contacting unit 22b.

Each of the contacting units 22b has a function of a plate spring (an arc spring and a line spring) by the bent portion 22d between the contacting unit 22b and the fixation unit 22a. When the contacting unit 22b is pressed to the fixation unit 22a side, the contacting unit 22b is biased toward in a direction separating from the fixation unit 22a. The contacting unit 22b is inclined in the direction separating from the fixation unit 22a progressively toward the tip of the contacting unit 22b. Further, the contacting unit 22b has a contact point unit 22e to contact the after-mentioned electrode 13 of the module 1 at the tip portion. The contact point unit 22e is bent in the direction of the fixation unit 22a at a predetermined position, and the surface of the bent portion of the contact point unit 22e which is the contacting surface with the electrode 13 is formed so as to be hemihedry.

The lead units 22c extend outside of the connector base 21 so as to be approximately parallel to the bottom surface of the connector base 21 via the opening portions formed at the lower surface of the side wall unit 21b of the connector based 21. Further, the lead units 22c are electrically connected and fixed to the electronic substrate (omitted from the drawing) at the extending portions.

Figure 5:
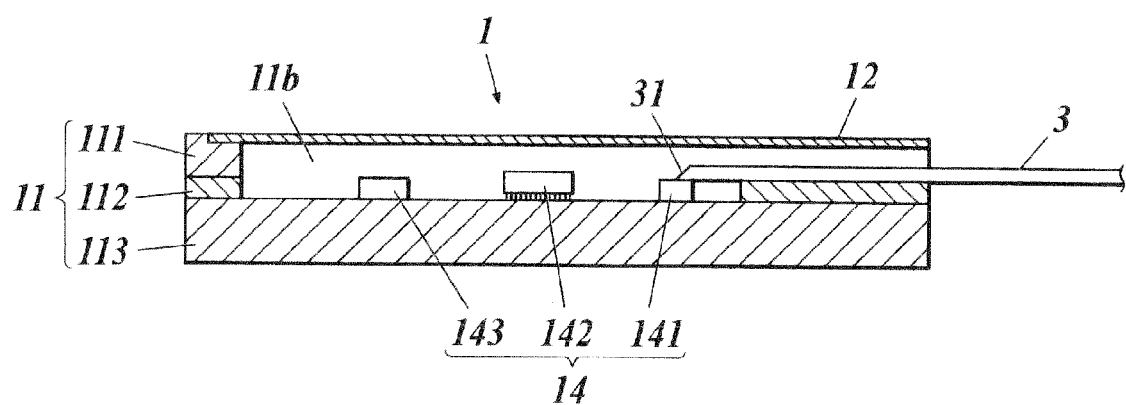
FIG. 5 is a cross-sectional view orthogonal to a width direction of the module.

As shown in FIG. 1, the light path member 3 is introduced into the approximately rectangular module 1 from the after-mentioned one end surface 11a of the module base 11 toward the longitudinal direction X to be connected with the after-mentioned optical signal processing unit 14 at inside the module 1 (see FIG. 5). The light path member 3 comprises a core and a clad (omitted from the drawing) to transmit optical signal, and the light path member 3 is an optical waveguide formed in a film-form although it is not limited to this.

Next, the module 1 will be described.

The module 1 comprises the module base 11, the cover 12, the electrode 13, the optical signal processing unit 14 (see FIG. 5). The module 1 is provided at the end portion of the light path member 3, and the module 1 electrically connects the light path member 3 and the connector 2 via the optical signal processing unit 14 by being engaged in the connector 2.

Figure 3:
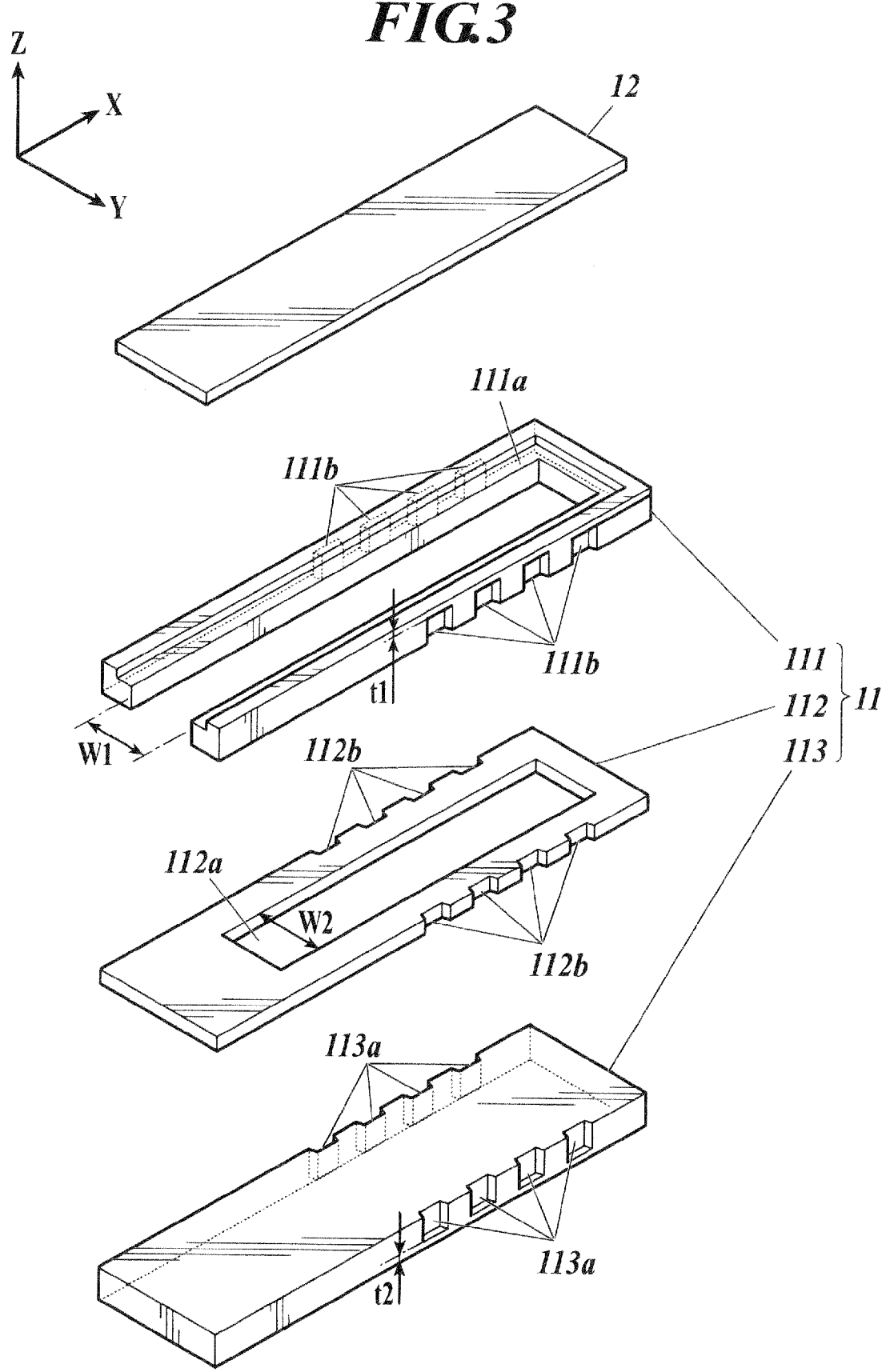
FIG. 3 is an exploded perspective view of a module base and a cover.

The module base 11 is formed in an approximately rectangular shape, and as shown in FIG. 3, the module base 11 is constructed by stacking the base upper portion 111, the base center portion 112 and the base lower portion 113 in which the lengths and the widths are formed in the same size. Further, when the module base 11 is made of ceramic, for example, the base upper portion 111, the base center portion 112 and the base lower portion 113 are integrally sintered.

The base upper portion 111 is formed in a U-shape when seen from above which opens in the longitudinal direction X, and a rectangular depression 111a to which the cover 12 engages is formed at the upper surface side of the base upper portion 111. The opening portion of the U-shape is formed so that the opening width w1 is slightly wider than the width of the light path member 3 so that the light path member 3 can be introduced. Further, the height from the bottom surface of the depression 111a to the bottom surface of the base upper portion 111 is formed so as to be higher than the thickness of the light path member 3.

Moreover, four pairs of upper concave portions 111b, each of two upper concave portions 111b constituting a pair being respectively positioned at both outer surfaces of the base upper portion 111 so as to have same distance in the longitudinal direction X from the end surface 111a side of the module base 11, are formed at both outer surfaces of the base upper portion 111 by being equally spaced along the longitudinal direction X. The upper concave portions 111b are opened toward the lower surface side by leaving shoulder portions having a thickness t1 at the upper surface side so that the bottom surface of the upper concave portions 111b lead to the lower surface of the base upper portion 111. Further, the upper concave portions 111b are formed at the positioned along the longitudinal direction where each of them match with each of the contact point units 22e of the contacts 22 when the module 1 is engaged in the hollow portion 21a of the connector 2. Moreover, the upper concave portions 111b are electrically connected with the after-mentioned center concave portions 112b and lower concave portions 113a.

The base center portion 112 is formed in a rectangular plate shape having a rectangular aperture 112a which penetrates in the height direction Z at approximately center thereof. The base center portion 112 is formed so that the thickness thereof is approximately same as the height of the after-mentioned light receiving/emitting element 141 of the optical signal processing unit 14. Further, the base center portion 112 is formed so that the aperture width w2 of the aperture 112a is narrower than the opening width w1 of the U-shape of the base upper portion 111.

Moreover, four pairs of center concave portions 112b, each of two center concave portions 112b constituting a pair being respectively positioned at both outer surfaces of the base center portion 112 so as to have same distance in the longitudinal direction X from the end surface 11a side of the module base 11, are formed at both outer surfaces of the base center portion 112 by being equally spaced along the longitudinal direction X. Each of the center concave portions 112b opens toward upper surface side and lower surface side so that the bottom surface of the center concave portion 112b leads to the upper surface and the lower surface of the base center portion 112. Further, each of the center concave portions 112b are formed so as to be disposed at the same position, when seen from above, with each of the upper concave portions 111b of the base upper portion 111, respectively. Furthermore, the center concave portions 112b are formed so as to have same bottom surface depth as the upper concave portions 111b of the base upper portion 111.

The base lower portion 113 is formed in a rectangular-plate shape, and four pairs of lower concave portions 113a, each of two lower concave portions 113a constituting a pair being respectively positioned at both outer surfaces of the base lower portion 113 so as to have same distance in the longitudinal direction X from the end surface 11a side of the module base 11, are formed at both outer surfaces of the base lower portion 113 by being equally spaced along the longitudinal direction X. Each of the lower concave portions 113a opens toward upper surface side leaving a shoulder portion having a thickness of t2 at the lower surface side so that the bottom surface leads to the upper surface of the base lower portion 113. Further, each of the lower concave portions 113a are formed at the same positions, when seen from above, with each of the upper concave portions 111b of the base upper portion 111. Moreover, the lower concave portions 113a are formed so as to have same bottom surface depth as the upper concave portions 111b of the base upper portion 111. Furthermore, the thickness t2 of the shoulder portions of the lower concave portions 113a are formed so as to have same thickness as the thickness t1 of the shoulder portions of the upper concave portions 111b.

Moreover, a substrate for the optical signal processing unit 14 to be mounted is formed on the upper surface of the base lower portion 113 as described later.

The module base 11 is formed by stacking the above described base upper portion 111, the base center portion 112 and the base lower portion 113 so that the lengths and widths are matched. Thereby, in the module base 11, the concave portion 11b having a step, which is opened toward upper surface, is formed (see FIG. 5) and also the base concave portions 11c which are formed by connecting the upper concave portions 111b, the center concave portions 112b and the lower concave portions 113a are formed at both outside surfaces of the module base 11, four base concave portions 11c in each side. As shown in FIG. 1, the base concave portions 11c are formed so that the bottom surfaces are formed on the same plan surface, and so that the base concave portions 11c extend in the same length toward upper surface and toward lower surface from the center line L, L of the height direction Z of each outside surface.

Figure 4A:
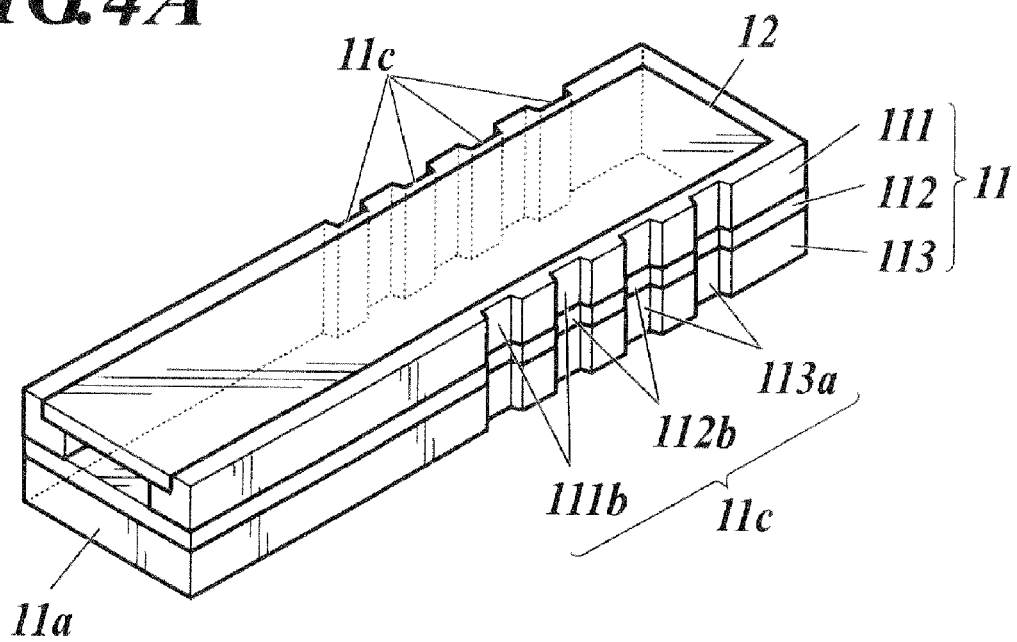
FIG. 4A is a schematic view of the module base and the cover in which a base concave portions are extended to the end of a lower surface from the end of an upper surface of the external surface.
Figure 4B:
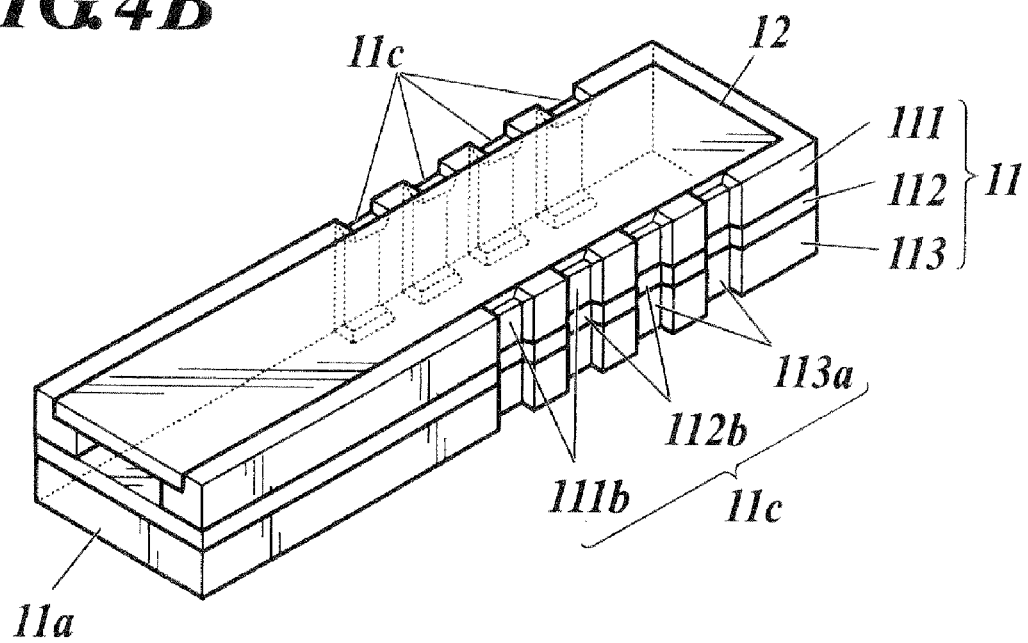
FIG. 4B is a schematic view of the module base and the cover in which the base concave portions are extended so as to exceed the upper surface and the lower surface.

Here, the base concave portions 11c may extend to the lower surface end from the upper surface end of the outside surfaces of the module base 11 by applying the upper concave portions 111b and the lower concave portions 113a which are opened toward upper direction and lower direction, respectively, as shown in FIG. 4A. Further, the base concave portions 11c may extend so as to exceed the upper surface and the lower surface of the module base 11 as shown in FIG. 4B However, in the later case, the portions of the base concave portions 11c which extend so as to exceed the upper surface of the module base 11 and the portions of the base concave portions 11c which extend so as to exceed the lower surface of the module base 11 are to be formed so as to have equal length from the outside surfaces.

Moreover, regardless of the shape of the base concave portions 11c, there is no need to form all four pairs of the base concave portions 11c in a uniformed shape. It is sufficient that at least the base concave portions 11c constituting one pair which are positioned at equal distance in the longitudinal direction X from the end surface 11a of the module base 11 are formed in same shape.

The cover 12 is formed in a rectangular plate shape where the length and the width of the cover 12 is slightly shorter than that of the depression 111a of the base upper portion 111 and where the thickness of the cover 12 is approximately same as the depth of the depression 111a. As shown in FIG. 5, the upper surface of the cover 12 forms approximately same plan surface with the upper surface of the module base 11 by the cover 12 engaging with the depression 111a so as to close the opening portion of the concave portion 11b of the module base 11.

The electrodes 13 are conductive members of the present invention. As shown in FIG. 1, the electrodes 13 are the conductive contacting pads provided at inner surface of the concave of the base concave portions 11c of the module base 11. Therefore, the electrodes 13 are formed in the same manner as the base concave portions 11c. That is, four pairs of electrodes 13, each of the electrodes 13 constituting a pair being respectively positioned at both outer surfaces of the module base 11 extending in the longitudinal direction X so as to have same distance in the longitudinal direction X from the end surface 11a of the module base 11, are formed at both outer surfaces of the module base 11. Further, the electrodes 13 are formed so as to extend in an equal length toward upper surface side and toward lower surface side of the module base 11 from the center line L, L of the height direction Z in each outside surface. Further, the electrodes 13 may extend to the lower surface end from the upper surface end of the outside surfaces of the module base 11 as shown in FIG. 4A. Further, the electrodes 13 may extend so as to exceed the upper surface and the lower surface of the module base 11 as shown in FIG. 4B.

The electrodes 13 are electrically connected to the optical signal processing unit 14. Further, the electrodes 13 outputs the optical signal from the light path member 3, which is converted into an electrical signal in the optical signal processing unit 14, to the connector 2 and also receives the electrical signal from the electronic substrate on which the connector 2 is mounted by contacting the contacts 22 when the module 1 is engaged in the hollow portion 21a of the connector 2.

As shown in FIG. 5, the optical signal processing unit 14 comprises the light receiving/emitting element 141, the integrated circuit 142 and the chip part 143. The light receiving/emitting element 141, the integrated circuit 142 and the chip part 143 are all mounted on the substrate formed at the upper surface of the base lower portion 113 inside the concave portion 11b of the module base 11. The light receiving/emitting element 141 is disposed so as to receive and emit the light which diffuses through the light path member 3 via the 45 degrees-mirror 31 at the end of the light path member 3, and is electrically connected with the electrodes 13 via the integrated circuit 142 and/or the chip part 143. In such way, the optical signal processing unit 14 can convert an optical signal from the light path member 3 into an electrical signal to output from the electrodes 13, and can convert an electrical signal from the electrode 13 into an optical signal to output from the light path member 3.

Figure 6A:
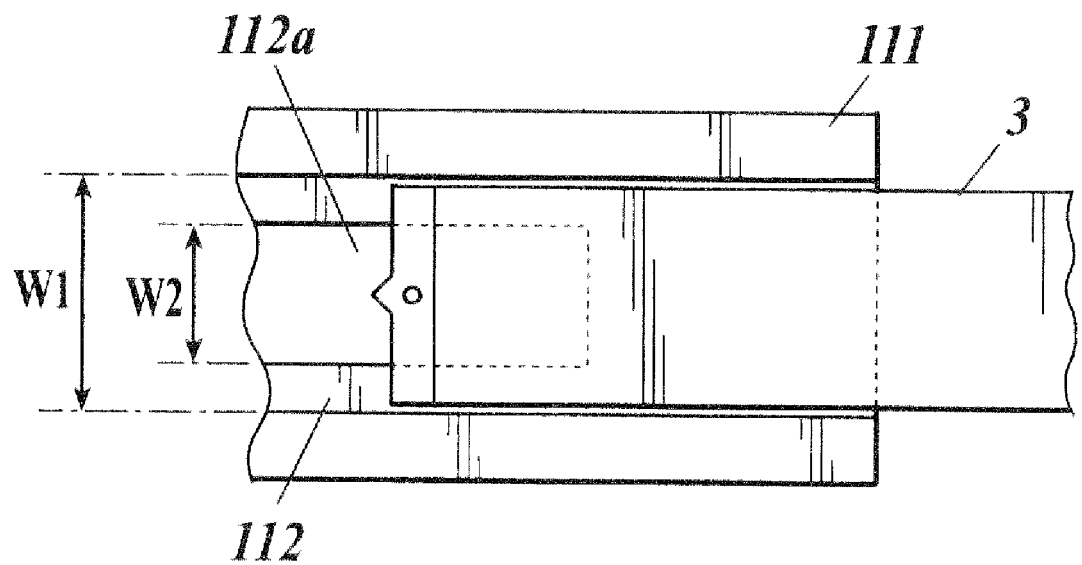
FIG. 6A is a partial upper surface view showing a connection condition between the light path member and the module.
Figure 6B:
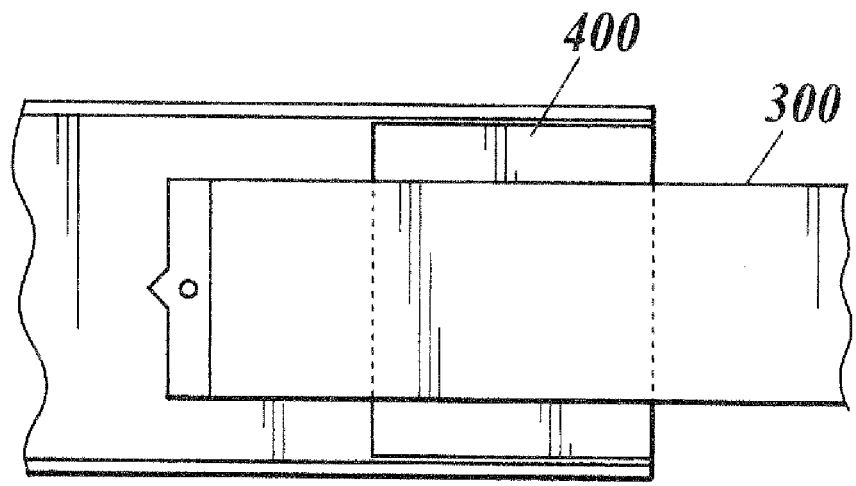
FIG. 6B is a partial upper surface view showing a conventional connection condition between the light path member and the module.

Moreover, because the light receiving/emitting element 141 has a height approximately same as the thickness of the base center portion 112 of the module base 11, there is no need to adjust the height by providing a spacer as in the conventional case, and the 45 degrees mirror 31 can be disposed on the light receiving/emitting surface just by adhering the light path member 3 on the base center portion 112. In addition, because the aperture width w2 of the aperture 112a of the base center portion 112 is formed so as to be narrower than the opening width w1 of the base upper portion 111, the adhering are of the light path member 3 and the base center portion 112 can be larger as shown in FIG. 6A comparing the conventional adhering area of the light path member 300 and the spacer 400 shown in FIG. 6B. Particularly, the light path member 3 can be prevented from pealing off because the edge portion of the light path member 3 which is easily peeled off can be adhered.

Figure 7A:
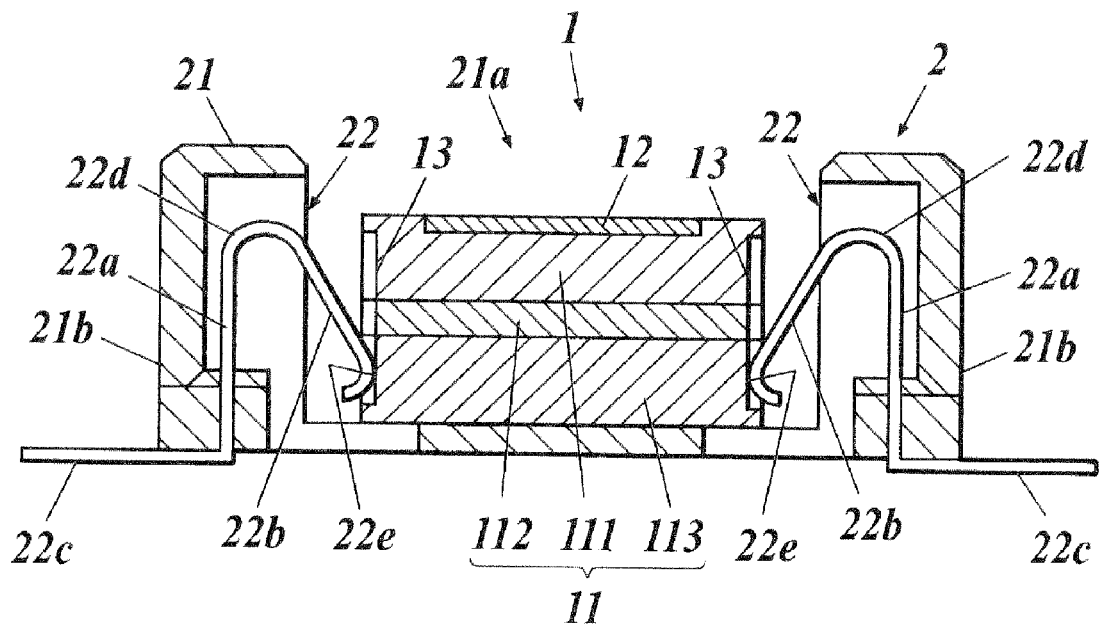
FIG. 7A is a cross-sectional view of the module which is engaged in the connector in a state where the lower surface of the module facing downward.
Figure 7B:
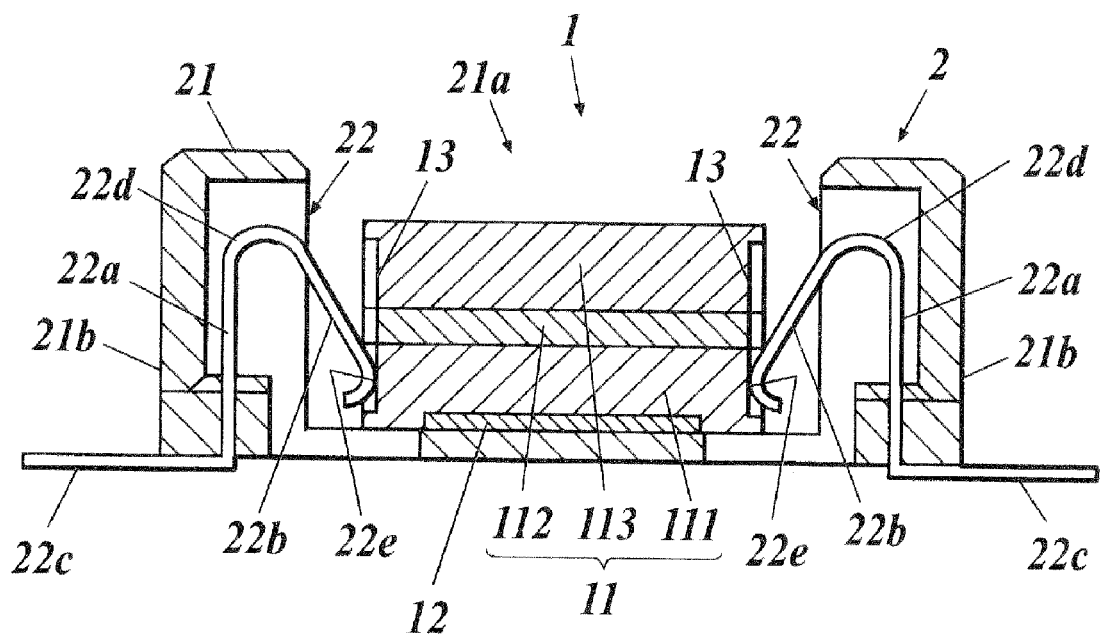
FIG. 7B is a cross-sectional view of the module which is engaged in the connector in a state where the upper surface of the module facing downward.

According to the above described module 1, the optical signal processing unit 14 can be housed in the concave portion 11b of the module base 11 and the electrodes 13 and the contact point units 22e of the contacts 22e can be made to contact one another in a similar manner in any of the case where the module 1 is engaged in the hollow portion 21a of the connector 2 in a state where the lower surface of the module 1 facing downward as shown in FIG. 7A and the case where the module 1 is engaged in the hollow portion 21a of the connector 2 in a state where the upper surface of the module 1 facing downward as shown in FIG. 7B. Therefore, the flexibility of design of the electronic substrate to which the connector 2 is to be mounted can be improved comparing to the conventional module which only can be engaged in a certain direction with respect to the connector 2.

Further, in the module 1, the upper surface of the cover 12 forms approximately one plan surface with the upper surface of the module base 11. Therefore, the contact between the electrodes 13 and the contacts 22 can be stable even when the module 1 is engaged in the hollow portion 21a of the connector 2 in a state where the upper surface of the module 1 facing downward.

Furthermore, the upper surface side of the module 1 can face the electronic substrate and the lower surface side of the module 1 can face the electronic substrate in a similar manner as described above even when the module 1 is reflow mounted directly on the electronic substrate (omitted from the drawing) and not being engaged in the connector 2.

Figure 9A:
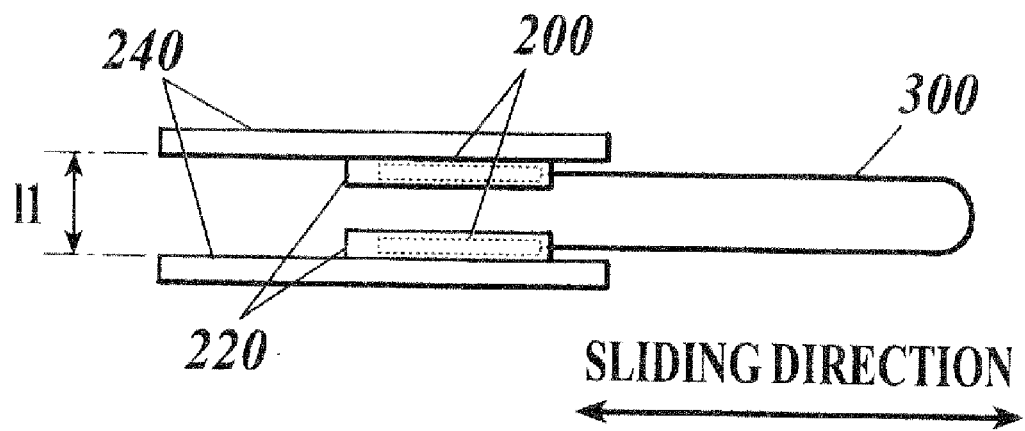
FIG. 9A is a diagram showing another example of the sliding condition of the conventional electronic substrate.
Figure 9B:
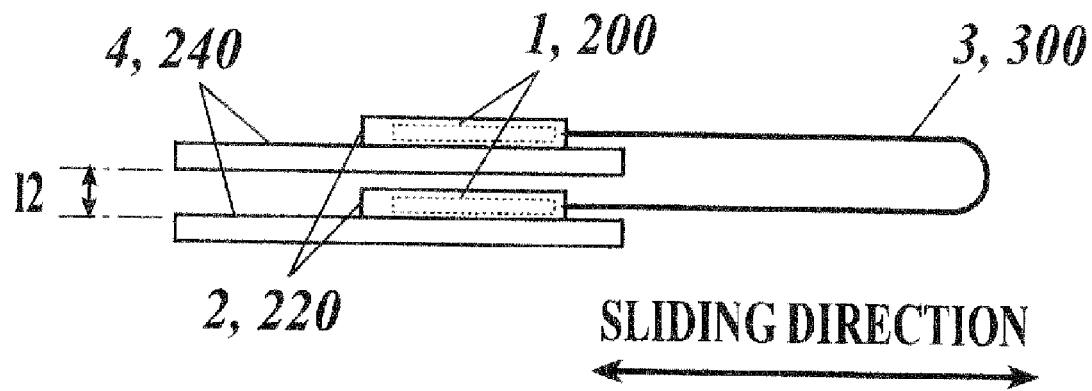
FIG. 9B is a diagram showing another example of the sliding condition of the electronic substrate using the module of the present invention.
Figure 10:
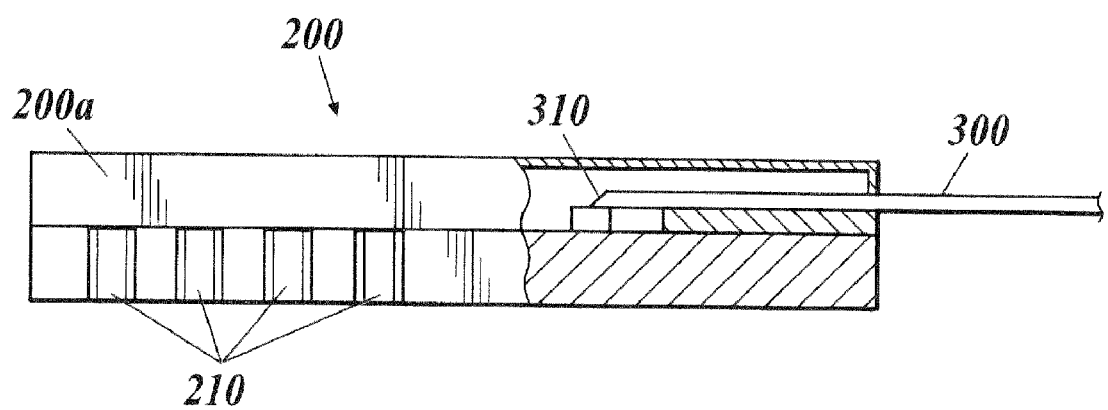
FIG. 10 is a side view of the conventional module.

Moreover, when the module 1 can be engaged with the connector 2 either in a state where the lower surface of the module 1 facing downward and in a state where the upper surface of the module 1 facing downward as described above, the two connectors 2, 2 can be connected to the two electronic substrates 4, 4 so that the electronic substrates and the connectors are arranged alternately as shown in FIG. 9B Therefore, the distance 12 between the two electronic substrates 4 can be shorter comparing to the distance 11 between the electronic substrates 240 in the conventional arrangement of the substrates where the two electronic substrates 240 sandwich the connectors 220, 220. Thus, a request for making the electronic parts thinner in the recent mobile devices having a sliding mechanism can be met.

Figure 8A:
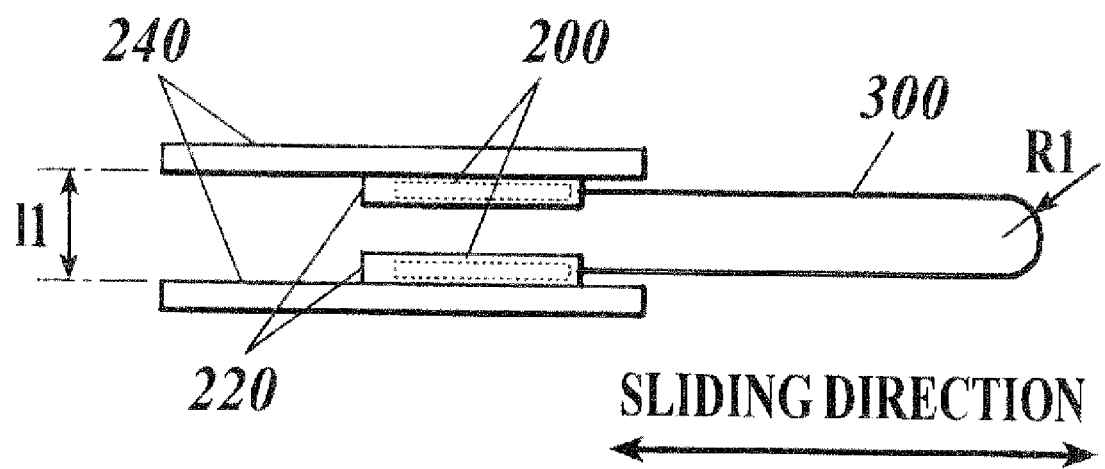
FIG. 8A is a diagram showing an example of a sliding condition of a conventional electronic substrate.
Figure 8B:
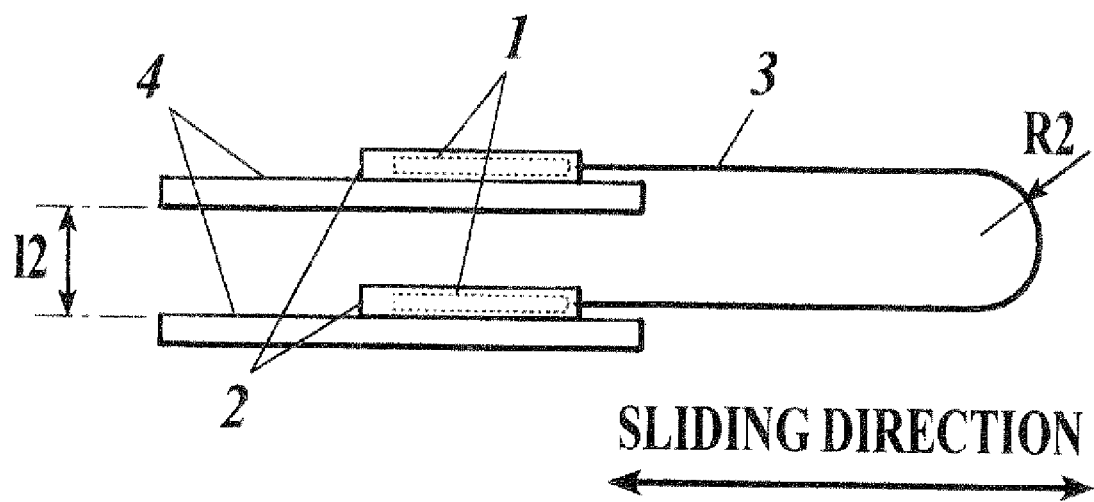
FIG. 8B is a diagram showing an example of a sliding condition of an electronic substrate using the module of the present invention.

Further, the radius R2 at the bending part of the light path member 3 can be made larger than the radius R1 at the bending part of the conventional light path member 300 by using the module 1 even when the distance l1 between the electronic substrates 4 where the module 1 is being used and the distance l1 between the electronic substrates 240 in the conventional arrangement of the substrates are equal distance as shown in FIGS. 8A and 8B. Therefore, damage to the light path member 3 due to the sliding motion of the electronic substrates 4, 4 can be reduced.

Here, in the above embodiment, the upper surface of the cover 12 does not have to be formed on an approximately same plan as the upper surface of the module base 11. In such case, it is sufficient as long as a condition where the contact between the electrodes 13 and the contacts 22 become unstable due to the upper surface of the cover 12 interfering the bottom surface of the hollow portion 21a does not occur when the module 1 is engaged in the hollow portion 21a of the connector 2 in a state where the upper surface of the module 1 facing downward.

Moreover, as for other aspects, the present invention is not limited to the above described embodiment and it is needless to say that the present invention can be arbitrarily modified.

According to a first aspect of the preferred embodiment of the present invention, there is provided an optical communication module which is provided at an end portion of a light path member and which electrically connects the light path member and a connector via an optical signal processing unit by being engaged in the connector comprising a module base in an approximately rectangular shape in which the light path member is introduce from one end surface in a longitudinal direction, a cover member provided at an upper portion of the module base and a plurality of pairs of conductive members in which each of the conductive members constituting a pair are respectively disposed at both outside surfaces of the module base extending in the longitudinal direction and which are electrically connected to the light path member, and a concave portion is formed at an upper surface of the module base, the cover member is formed so as to cover an opening of the concave portion, and the conductive members are formed so as to extend for equal lengths toward an upper surface side and a lower surface side of the module base from a center line of a height direction of the outside surfaces.

Preferably, at least one pair of the conductive members, each of the conductive members constituting the one pair being disposed so as to have equal distances from an end surface in the longitudinal direction, is formed so as to extend to a lower surface end from an upper surface end of the outside surfaces.

Preferably, at least one pair of the conductive members, each of the conductive members constituting the one pair being disposed so as to have equal distances from the end face in the longitudinal direction, extends so as to exceed the upper surface and a lower surface of the module base and is formed so that extending portions in the upper surface and extending portions in the lower surface are equal lengths.

Preferably, the cover member is formed so that an upper surface of the cover member forms an approximately one plan with the upper surface of the module base.

Preferably, the light path member is an optical waveguide formed in a film-form.

According to the present invention, a concave portion is formed at the upper surface of the module base, and a plurality of pairs of conductive members, in which each of the conductive members constituting a pair is respectively disposed at both outside surfaces of the module base, are formed so as to extend for equal lengths toward an upper surface side and a lower surface side of the module base from a center line of a height direction of the outside surfaces of the module base. Therefore, the conductive members as electrodes and the contacts of the connector can be made to contact each other in a similar manner even when the optical communication module is inserted in the connector in a state where the upper surface side thereof facing downward or when the optical communication module is inserted in the connector in a state where the lower surface side thereof facing downward by housing the optical signal processing unit in the concave portion of the module base. Therefore, flexibility of design of the electronic substrate to which the connector is to be mounted can be improved comparing to the conventional optical communication module which can only be engaged in the connector in a certain direction with respect to the connector.

The entire disclosure of Japanese Patent Application No. 2008-100918 filed on Apr. 9, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An optical communication module which is provided at an end portion of a light path member and which electrically connects the light path member and a connector via an optical signal processing unit by being engaged in the connector, the optical communication module comprising:

a module base, having an approximately rectangular shape, in which the light path member is introduced from one end surface in a longitudinal direction;

a cover member provided at an upper portion of the module base; and a plurality of pairs of conductive members which are electrically connected to the light path member, wherein in each of the pairs the conductive members constituting the pair are respectively disposed at both outside surfaces of the module base extending in the longitudinal direction, wherein the module base comprises a base upper portion, a base central portion, and a base lower portion, which are stacked so as to form a concave portion at an upper surface of the module base, wherein the cover member is formed so as to cover an opening of the concave portion, and wherein the conductive members are formed so as to extend for equal lengths toward an upper surface side and a lower surface side of the module base from a center line of a height direction of the outside surfaces.

2. The optical communication module as claimed in claim 1, wherein at least one pair of the conductive members, the conductive members constituting the one pair are disposed so as to be equal distances in the longitudinal direction from an end surface of the module base, and each of the conductive members constituting the one pair is formed so as to extend to a lower surface end from an upper surface end of the outside surface at which the conductive member is disposed.

3. The optical communication module as claimed in claim 1, wherein in at least one pair of the conductive members, the conductive members constituting the one pair are disposed so as to be equal distances in the longitudinal direction from an end surface of the module base, and each of the conductive members constituting the one pair extends so as to exceed the upper surface and a lower surface of the module base and is formed so that an extending portion thereof extending past the upper surface and an extending portion thereof extending past the lower surface are equal lengths.

4. The optical communication module as claimed in claim 1, wherein the cover member is formed so that an upper surface of the cover member and the upper surface of the module base approximately lie in a same plane.

5. The optical communication module as claimed in claim 1, wherein the light path member is an optical waveguide formed in a film-form.

6. The optical communication module according to claim 1, wherein the base upper portion of the module base is formed in a U-shape opening in the longitudinal direction when seen from above, wherein the base central portion of the module base is formed in a rectangular plate shape having a rectangular aperture which penetrates through the base central portion in a height direction at approximately a center of the base center portion, and wherein the base lower portion of the module base is formed in a rectangular plate shape.

7. The optical communication module according to claim 1, wherein the light path member is attached on the base central portion.

* * * * *